Aug. 2, 1966 K. H. MIDDENDORF 3,263,384
APPARATUS FOR POST-TENSIONING CONCRETE PRESTRESSING MEMBERS
Original Filed Jan. 21, 1960 6 Sheets-Sheet 1

INVENTOR.
KARL H. MIDDENDORF
BY Alfred R. Fuchs
ATTORNEY

Aug. 2, 1966   K. H. MIDDENDORF   3,263,384
APPARATUS FOR POST-TENSIONING CONCRETE PRESTRESSING MEMBERS
Original Filed Jan. 21, 1960   6 Sheets-Sheet 2

INVENTOR.
KARL H. MIDDENDORF
BY Alfred R. Fuchs
ATTORNEY

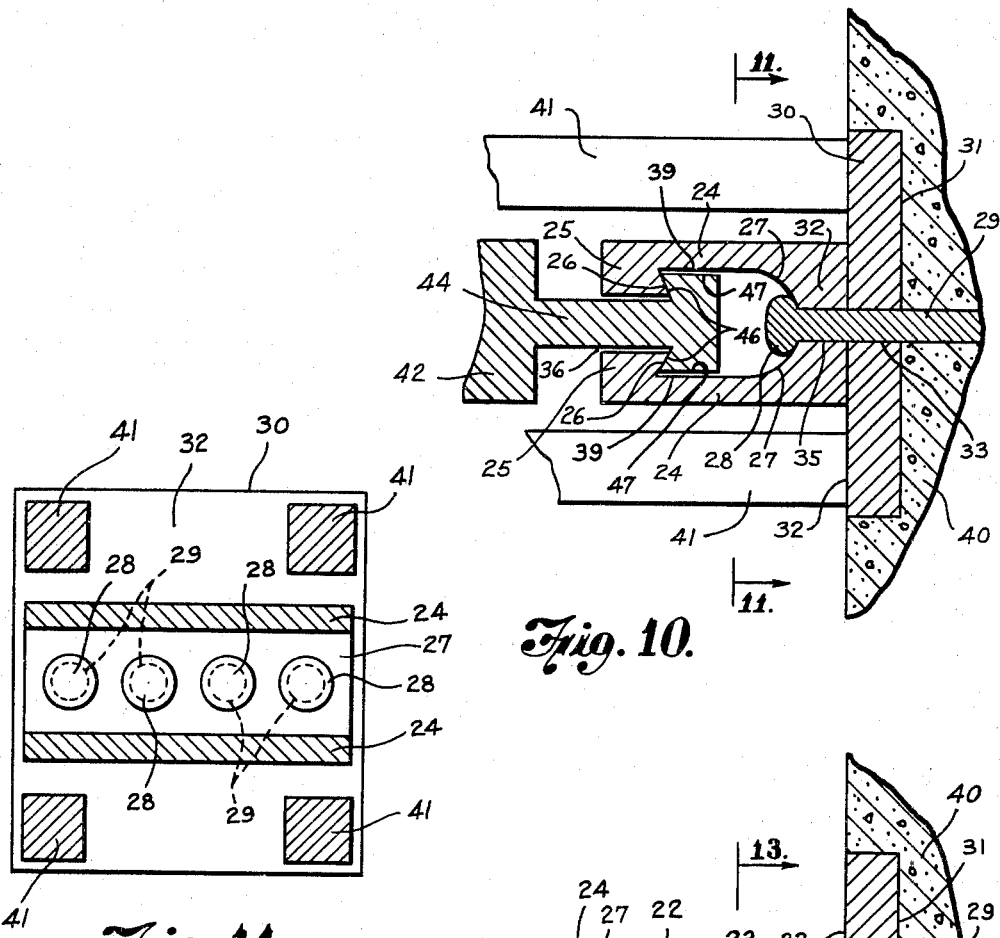
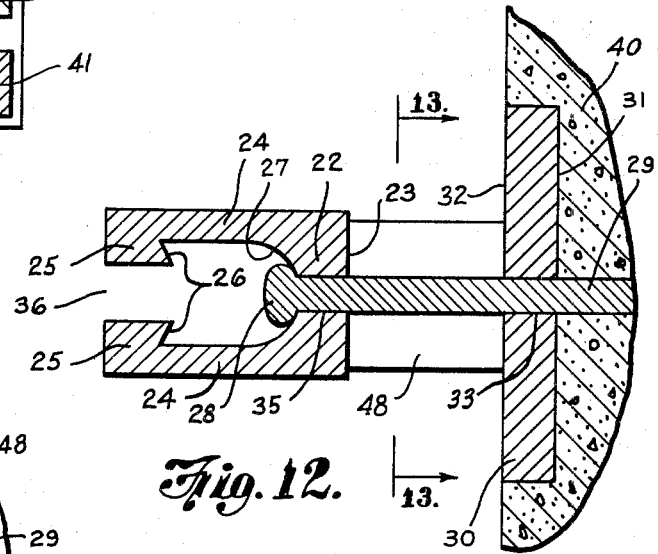
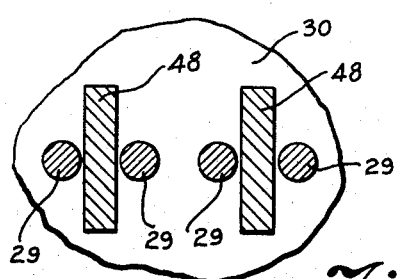

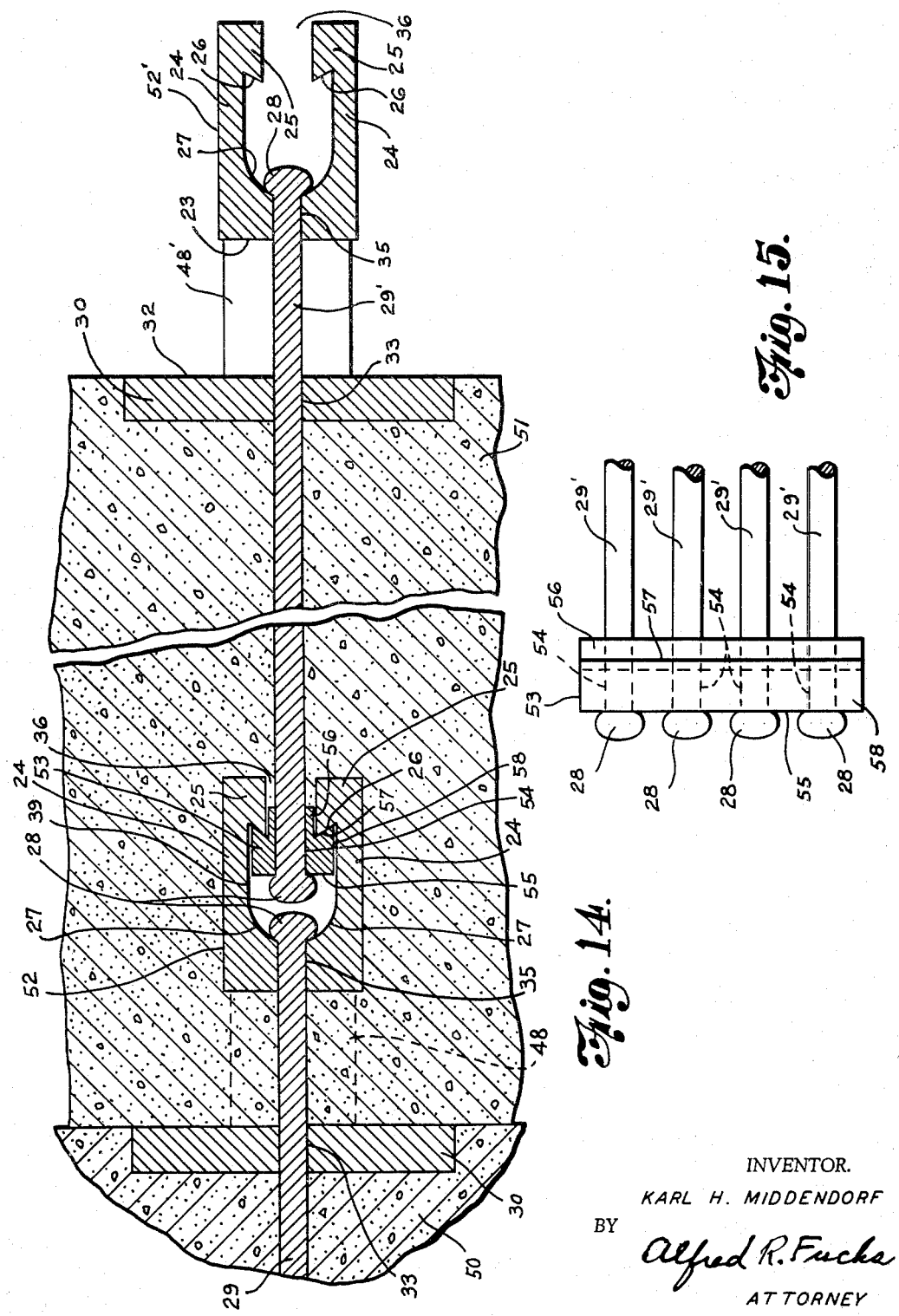

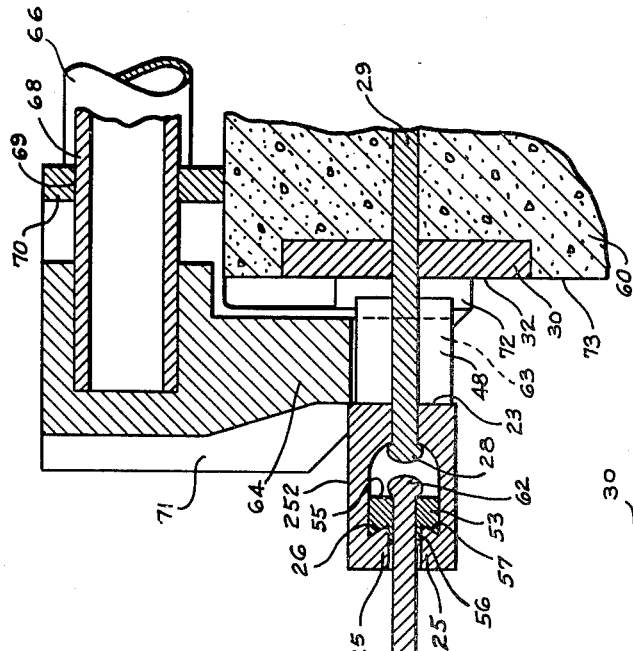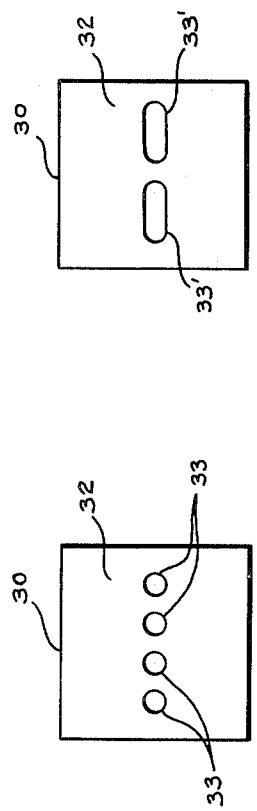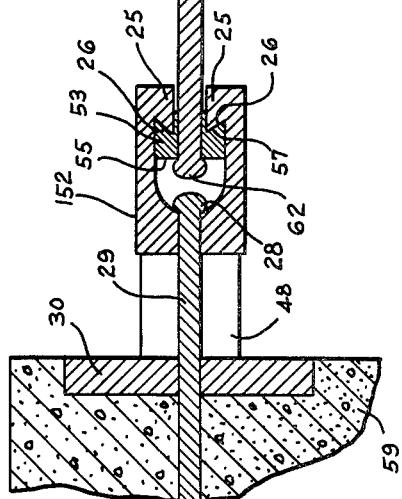

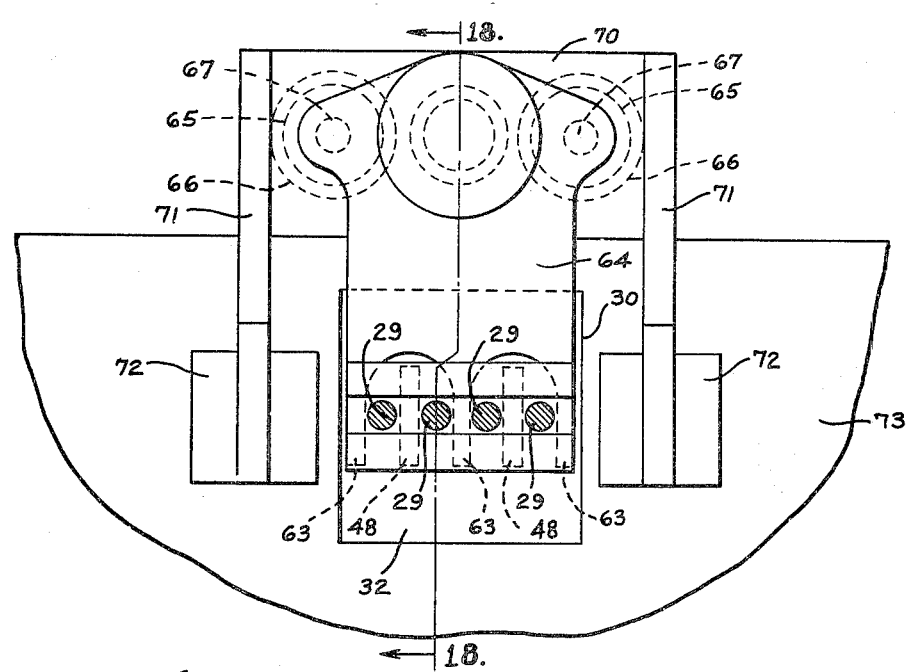
Fig. 19.
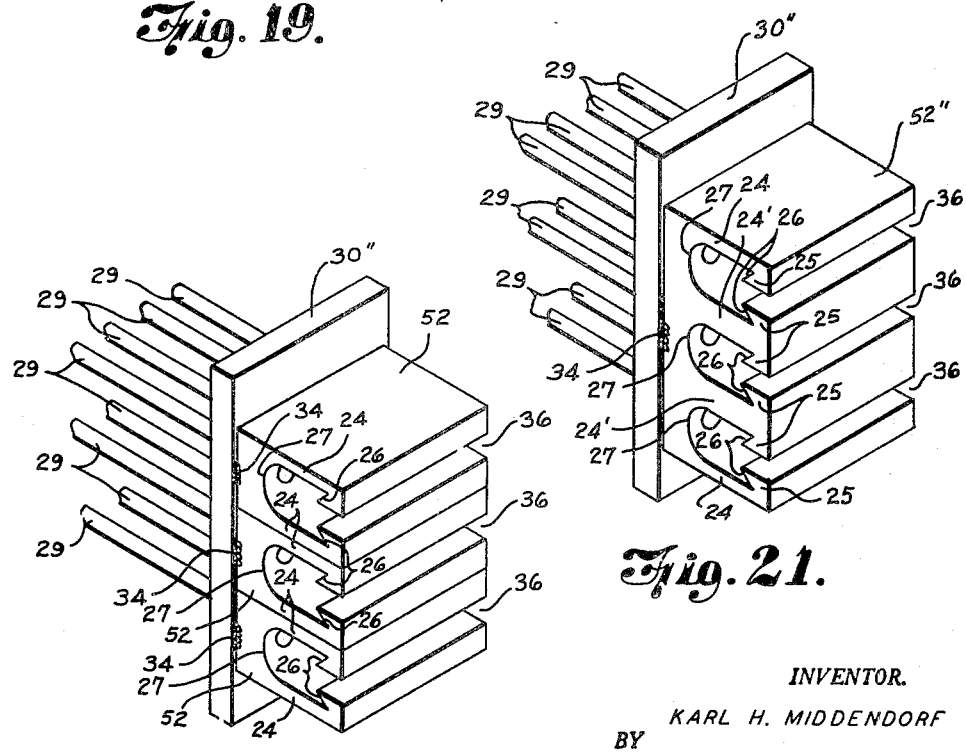
Fig. 20.
Fig. 21.
INVENTOR.
KARL H. MIDDENDORF
BY Alfred R. Fuchs
ATTORNEY

United States Patent Office 3,263,384
Patented August 2, 1966

3,263,384
APPARATUS FOR POST-TENSIONING CONCRETE PRESTRESSING MEMBERS
Karl H. Middendorf, Costa Mesa, Calif., assignor to The Prescon Corporation, a corporation of Texas
Original application Jan. 21, 1960, Ser. No. 3,851. Divided and this application Oct. 19, 1964, Ser. No. 409,622
12 Claims. (Cl. 52—173)

This is a division of the application of Karl H. Middendorf, Serial No. 3,851, filed Jan. 21, 1960. My invention relates to an apparatus for post-tensioning concrete prestressing members.

It is a purpose of my invention to provide a prestressing method and apparatus involving the post-tensioning of tension members that provides a positive anchorage for said tension members, and which is of such a character that the use of threaded connections between the anchor member and the pulling member for placing the tension members under stress is entirely avoided.

It is a purpose of the invention to provide a positive anchorage for post-tensioned tension members in prestressed concrete, which is assembled ready for installation in the concrete structure in such a manner that none of the parts thereof can be displaced or lost and which is provided with such a connection between a pulling member of a stressing apparatus, such as a hydraulic jack, and the anchor member of the post-tensioning means, which can be readily made by simple sliding engagement of the pulling member with the anchor member and which requires no screw-threaded connections. It is a further purpose of the invention to provide an anchorage whereby prestressing can be extended by coupling on added tension members where a plurality of slabs are cast in side by side relation, and which also is adapted for extending a coupling means across a knit strip between sections of a lift slab structure whereby the prestressing across the structure is continuous, or other structures in which such continuity is desirable.

My invention further includes the provision of an anchor member that is channel shaped in cross section, that is temporarily connected with the bearing member by tack welds or other temporary means in a face to face relationship, with the legs of the channel member extending away from the bearing member, and to provide a connection between a pulling member and the anchor member such that the legs of the channel member and the pulling member are so interlocked as to prevent harmful flexing of said legs, said anchor member being moved away from the bearing member by a pulling action on the legs thereof by the pulling member. The interlocking connection between the legs of the anchor member and the pulling member is accomplished by providing a pulling member that has a body portion that fits closely between the legs of the channel shaped anchor member so as to prevent any undue inward flexing of the legs of the channel shaped member and to provide such a connection between the outer ends of the legs of the channel member and said pulling member that said outer ends can not move away from each other or flex outwardly, the connection being such that the stress under which the connection is placed is primarily shear, this being preferably accomplished by providing inwardly directed undercut flanges at the extremities of the legs that are engaged by undercut shoulders on the pulling member so that said pulling member and said legs are interlocked at said extremities.

It is a further purpose of my invention to provide an anchor member for tension members for prestressing concrete, that has a body portion that is channel shaped in cross section so as to provide a pair of parallel legs on said anchor member that are connected by a transverse portion that has openings therethrough for the tension members, which legs have inwardly directed undercut flanges at their extremities, and which transverse portion has a flat outer face for engagement with the flat face of a bearing plate, the anchor member being tack welded in its face to face relationship to the bearing plate, or temporarily secured in such relationship in any other suitable manner.

It is a further purpose of my invention to provide an anchor member of the above referred to character that is associated with a flat faced bearing member, such as a bearing plate, having openings or slots therein for the tension members, and which is used in conjunction with headed tension members that have their heads seated against the inner face of the transverse portion of the channel shaped anchor member, and to provide retaining means for holding said heads in engagement with such transverse portion.

It is a further purpose of my invention to provide, for use in conjunction with such an anchor member, means for tensioning the tension members, comprising a pulling member that has a bar-like head portion thereon having undercut shoulders thereon engaging the undercut flanges of the anchor member, and which is of such a character that the side faces of the bar-like head portion engage the inner sides of the legs to prevent any harmful inward flexing thereof or inward bowing thereof, and to prevent any undue outward flexing or bowing of the ends of said legs.

It is a further purpose of my invention to provide an anchorage for tension members in a concrete structure, comprising a bearing plate having openings or slots therein for the tension members, an elongated anchor member channel shaped in cross section having a plurality of openings in the transverse portion thereof and having shims mounted betwen pairs of tension members and engaging the flat face of the bearing plate and the outer transverse portion of the anchor member to hold the anchor member in properly spaced relation to the bearing plate to place the tension members under the desired stress.

It is another purpose of my invention to provide means for connecting an anchor member associated with one slab or other structural unit with tensioning means utilized for prestressing an adjacent slab or structural unit, comprising an anchor bar longitudinally slidably engaged with said anchor member, said anchor member having undercut flanges on the legs thereof and said anchor bar having undercut shoulders thereon for providing a connection between said anchor member and said anchor bar whereby the second slab, upon being prestressed, will be tightly drawn against the first mentioned unit in edge to edge engagement to prevent any openings or cracks between the adjacent units. Said anchor bar is also adapted to be used for connecting the anchorage for the prestressing means in two adjacent lift slabs across a knit strip so that the prestressing will be continuous across the structure.

Other objects and advantages of my invention will appear as the description of the drawings proceeds. I desire to have it understood, however, that I do not intend to limit myself to the particular details shown or described, except as defined by the claims.

In the drawings:

FIG. 10 is a fragmentary view partly in elevation and partly in section, showing the position of the parts occupied in FIG. 6.

FIG. 11 is a section taken on the line 11—11 of FIG. 10.

FIG. 12 is a view similar to FIG. 10, showing the position of the parts after the shims have been put in place as shown in FIG. 9.

FIG. 13 is a section taken on the line 13—13 of FIG. 12.

FIG. 14 is a fragmentary vertical sectional view through a concrete structure, showing the means for prestressing two adjacent slabs in such a manner that the adjacent edges thereof are tightly pressed together.

FIG. 15 is a plan view of an anchor bar, such as used in the structure shown in FIG. 14, fragmentary portions of the tension members being shown associated therewith.

FIG. 16 is a face view of a bearing plate such as used in my improved anchorage.

FIG. 17 is a similar view of a modification thereof.

FIG. 18 is a fragmentary longitudinal vertical sectional view taken substantially on the line 18—18 of FIG. 19, showing the means for coupling two adjacent prestressed lift slabs together so as to provide for continuous prestressing of the structure across the knit strip between said slabs.

FIG. 19 is a transverse sectional view through the structure shown in FIG. 18.

FIG. 20 is a perspective view partly broken away, showing a multiple anchorage made in accordance with my invention, and FIG. 21 is a similar view of a modified form of multiple anchorage.

Figure 1:
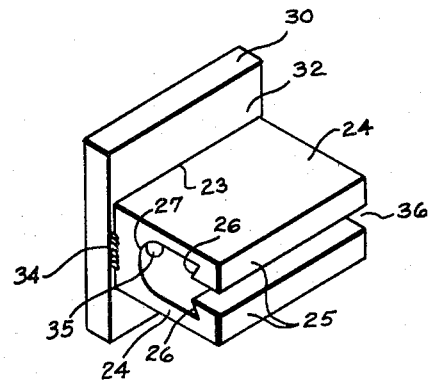
FIG. 1 is a perspective view showing the first step in making an anchorage for tension members in a prestressed, post-tensioned concrete structure, in accordance with my invention.

Referring in detail to the drawings, my improved anchorage comprises an anchor member that is shown in cross section in FIGS. 10 and 12, which has a channel shaped body portion and is of an elongated character, having a transverse portion 22 that has a flat outer face 23 and a pair of legs 24 that are provided with inturned flanges 25 at their extremities, having inclined wall portions 26 on their inner faces to thus provide an undercut inner face to each of said flanges 25. The inner face of the transverse portion 22 is preferably curved as shown at 27, so as to provide a suitable seat for the head portion 28 or enlargement on the tension member 29 and a stronger structure.

Cooperating with said channel shaped anchor member is a bearing member, which is shown as in the form of a plate 30, having flat inner and outer faces 31 and 32, and which is provided with openings 33 for the tension members 29. The openings may be either of a circular character, such as shown in FIG. 16, there being one opening for each tension member, or the plate may be provided with slots 33′ for receiving the tension members as shown in FIG. 17, said slots being provided to accommodate two or more tension members, as may be found to be desirable.

In constructing my anchorage, the bearing member 30 is first secured temporarily to the channel shaped anchor member as by tack welding said anchor member to the bearing plate in the position shown in FIG. 1, one of the tack welds being indicated at 34, and a similar tack weld being provided at the other end of the anchor member to thus secure the anchor member and the bearing member in position with the flat face 23 of the anchor member in engagement with the flat face 32 of the bearing member and with the openings 35 provided in the transverse portion 22 of the anchor member in alignment with the openings 33 or 33′ of the bearing member 30, as the case may be, so that the tension members 29 can be readily passed through said openings. Each of the anchor members is provided with a plurality of openings 35 therein for the tension members 29, which are arranged in a row, as will be obvious from FIG. 11, so that the heads 28 of the tension members will be arranged in the assembled structure as shown in FIG. 11. It is important that the tack welding be done before the tension members are put in position and before the same are headed because it is undesirable to apply any heat to the tension members, such as might change the tensile strength thereof.

Figure 2:
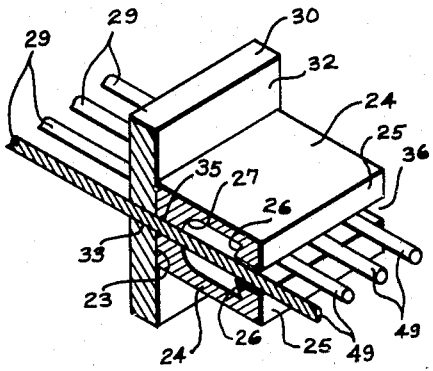
FIG. 2 is a view partly in perspective and partly in section, showing the second step of making said anchorage.
Figure 3:
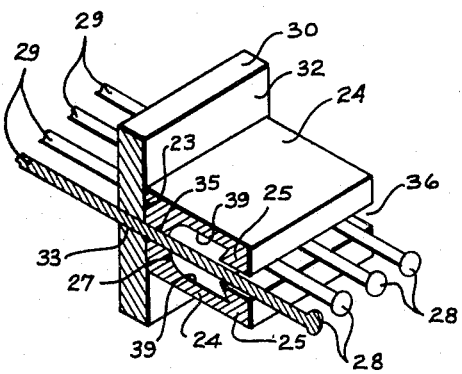
FIG. 3 is a view similar to FIG. 2, showing the third step of making said anchorage.
Figure 4:
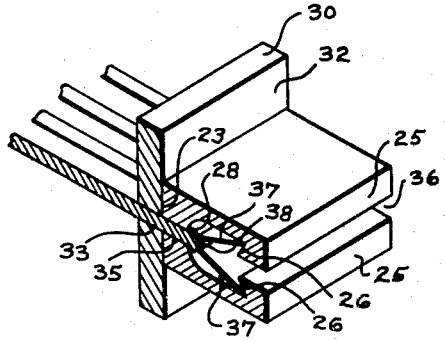
FIG. 4 is a similar view, showing the anchorage before stressing the tension members.

After the channel shaped anchor member and the bearing member have been tack welded to each other so as to be temporarily secured together as shown in FIG. 1, the tension members 29 are placed in position through the openings so that the ends 49 thereof extend outwardly beyond the flanged extremities of the legs 24 of the anchor member as shown in FIG. 2. While the tension members are shown as being only slightly extended beyond the outer ends of the legs 24, it is obvious that these tension members can be pulled through to a desired position so that the heads 28 can be conveniently formed thereon by a cold forming method, the wires after heading being illustrated in FIG. 3. It is, of course, to be understood that the heads 28 are of such a size that they can pass through the slot 36 between the two flanges 25 on the anchor member and so that these will not pass through either the openings 35 or the openings 33 or the slots 33′. After the heads 28 have been formed on the tension members 29 the tension members are moved to the position shown in FIG. 4 with the heads 29 in engagement with the curved surface 27 of the anchor member and sheet metal clips having diverging legs 37 are slipped endwise into the anchor member in such a position that the transverse portion 38 thereof, which is slightly dished to receive the heads 28, will be in engagement with said heads and the ends of the legs will be seated in the pockets provided in the anchor member at the junction of the inclined surfaces 26 and the inner faces 39 of the legs 24. The tension members will be provided with a similar anchorage at the other end thereof and the entire structure comprising the tension members 29 and the anchorage at opposite ends thereof arranged and held as shown in FIG. 4 can then be transported to the place of use and the structure mounted in the form for the concrete and the concrete poured and permitted to set with the parts in the position shown in FIG. 5. The bearing member 30 will then be anchored firmly in the concrete structure 40 with the flat face 32 thereof on the outer face of the concrete structure and with the tension members 29 in their desired position in the concrete structure. After the concrete structure 40 has set sufficiently for it to be prestressed, a jack having a plurality of legs 41 engaging the outer flat face 32 of the bearing member, and which has a pulling member 42 that has a head 43 thereon, is placed in the position with respect to the anchorage shown in FIG. 6, the holding clip having been first removed. The head 43 of the pulling member is a bar-like member, as will be obvious from FIG. 6, that is integral with the shank portion 44 of the pulling member 42, and which has a central rib portion 45 that seats between the flanges 25 on the anchor member, and which has inclined shoulders 46 thereon that seat against the inclined walls 26 of the flanges 25 on the anchor member. It will also be noted that the head portion of the pulling member has side faces 47 that lie closely adjacent the inner faces 39 of the legs 24, being only sufficiently spaced therefrom that the head portion 43 can be slid lengthwise of the anchor member into the relationship thereto that is shown in FIGS. 6 and 10.

Figure 6:
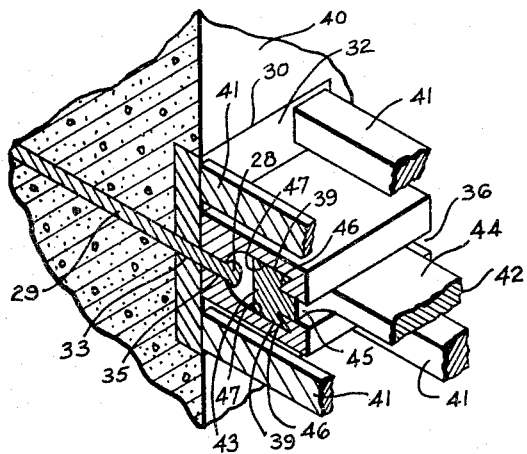
FIG. 6 is a view similar to FIG. 5, showing the means for applying the stress to the tension members partly broken away.
Figure 7:
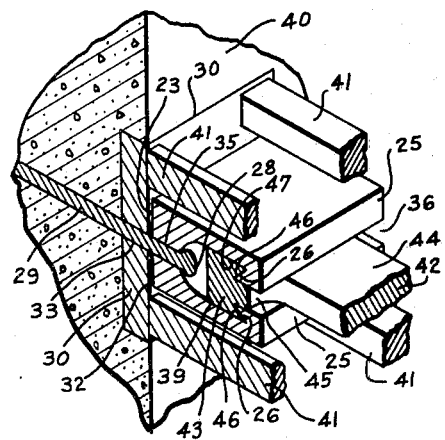
FIG. 7 is a view similar to FIG. 6, showing the beginning of the stressing operation.

With the legs 41 of the jack in the position shown in FIG. 6, the jack is operated so as to cause the pulling member 42 to be moved away from the bearing member 30, and it will be obvious that with the legs 41 engaging with the bearing member 30 the force exerted by the pulling member 42 through the head 43 will, at the beginning of such pulling action, break the tack welds, thus separating the anchor member from the plate 30 as shown in FIG. 7. The pull exerted by the pulling member 42 would have a tendency to bow the legs 24 inwardly, but this is prevented by engagement of the head 43 of the pulling member with the legs so as to prevent any appreciable amount of inward flexing of said legs. At the same time there is a tendency for the outer ends of the legs to flex outwardly, or move away from each other, but this is prevented by the interlocking connection between the shoulders on the head portion of the pulling member and the inclined or undercut faces of the flanges 25 on the anchor member, the resistance to such flexing causing primarily a shear stress across the connection between said anchor member and pulling member at the flanges, which is taken up by the structure without any damage thereto.

Figure 8:
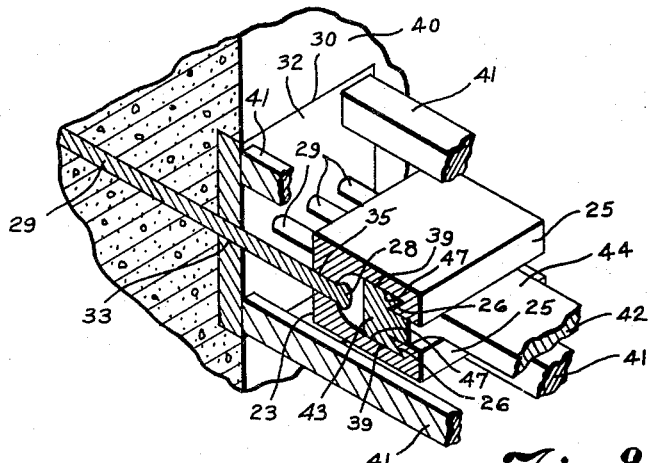
FIG. 8 is a view similar to FIG. 6, showing the parts in their position at completion of the tensioning of the tension members.
Figure 9:
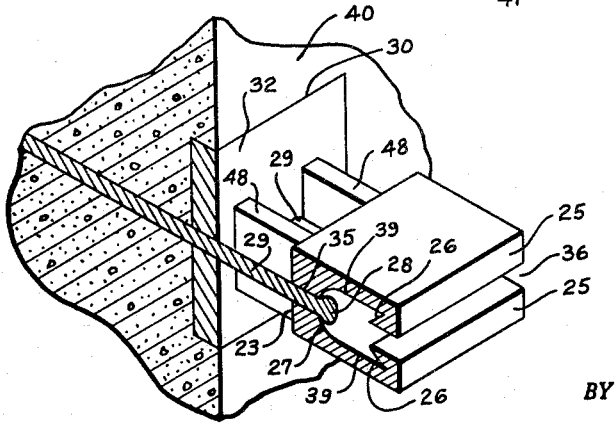
FIG. 9 is a view similar to FIG. 5, showing the shims in position for holding the tension members stressed, the pulling means being removed.

The pulling action of the pulling member is continued so as to move the anchor member away from the plate 30 to a position such that the tension members 29 are stressed to the desired amount to put the desired tension thereon for exerting the desired compression stress on the concrete, this position of the pulling member and the anchor member being shown in FIG. 8. After this position has been reached, the shims, which are shown as being plate-like members 48, are placed in position as shown in FIG. 9, and the pulling member is removed by sliding the same longitudinally of the anchor member out one end thereof.

In FIGS. 12 and 13 the anchor member is shown in its final position with the shims 48 in place. It will be noted that there is a shim 48 located between each pair of wires 29. It will also be noted upon reference to FIGS. 10 and 11 that the leg portions 41 of the stressing apparatus and the head 43 of the pulling member are so located during the stressing operation that the shims 48 can be readily put in position between the paired tension members 29.

Figure 5:
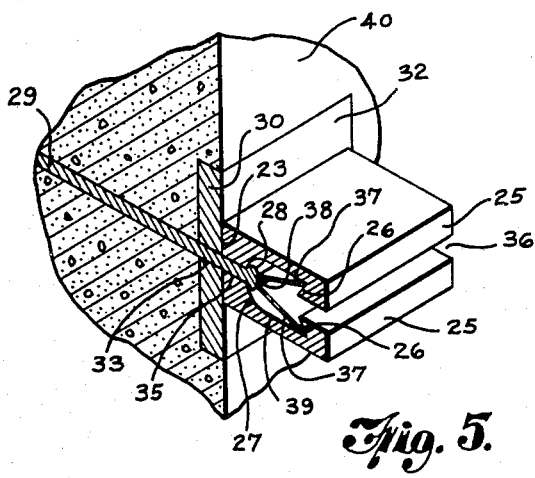
FIG. 5 is a fragmentary view partly in section through the concrete structure and my anchorage, showing the anchorage in position in the concrete structure before stressing the tension members.

The method hereinbefore described for prestressing a concrete structure can be applied to concrete structures that are arranged in adjacency to each other so as to hold said structures in tight edge to edge engagement where the same adjoin. The method of doing this is illustrated in FIG. 14. A slab 50 is shown that has the bearing plate 30, such as previously described, mounted therein, and a channel shaped anchor member 52 of the character previously described mounted in position in spaced relation to the bearing plate 30, with the shims 48 mounted between the bearing plate 30 and the anchor member 52 to hold the tension members 29 under the desired tension. It is, of course, to be understood that these parts are in the position shown in FIG. 14 before the slab 51, which is adjacent the slab 50, is poured. Instead of providing a separate anchorage for the tension members 29' provided for the slab 51 at the end thereof adjacent the slab 50, the anchor members 52 are utilized for anchoring the ends of the tension members 29' adjacent the slab 50. In order to do this, a dead end anchor bar 53 is provided, which is shown in plan view in FIG. 15. Said anchor bar 53 is provided with a row of spaced openings 54 for the tension members 29', which are provided with heads 28 that engage the flat face 55 of said anchor bar. Said anchor bar is of similar shape to the head 43 of the pulling member 42, having a central rib portion 56 that is seated in the slot 36 of the anchor member 52, and inclined shoulders 57 that engage the inclined surfaces 26 of the flanges 25 of said anchor member. The stressing unit for the slab 51 made up of the dead end anchor bar 53, the tension members 29' having the heads 28 on the ends thereof, the bearing plate 30 for the prestressing means for the slab 51 and the anchor member 52', which is the same in construction as the anchor member 52, are assembled with the bearing plate 30 and the anchor member 52' tack welded in the manner previously referred to and with the clip in position as shown in FIGS. 4 and 5 and the anchor member 30 placed in position in the form which it is to have when the concrete for the slab 51 has been poured, the anchor bar 53 having been slid into position in the anchor member 52 with the opposite side faces 58 thereof closely adjacent the inner side walls of the legs 24 of the anchor member 52. The tension members 29' are then stressed in the manner previously described in connection with the concrete body 40 in FIGS. 1 to 9 inclusive, the shims 48' being placed in position in the same manner as were the shims 48 in tensioning the tension members 29.

The tension members 29' having thus been stressed, the concrete body 51 will be put under compression and the forces exerted by the tension members 29' on the concrete body 51 will cause the edge thereof engaging the adjacent edge of the concrete body 50 to be pressed tightly thereagainst, thus preventing any openings or cracks between the two adjacent bodies of concrete 50 and 51.

In FIG. 18 a pair of prestressed slabs 59 and 60 are shown, each of which has tension members 29 therein, which have been stressed in the manner previously described, so that the anchor members 152 and 252, which are the same in construction as the anchor members 52, are held spaced from the bearing plates 30 by means of the shims 48 as previously described. In lift slab structures the space between the lift slabs, such as the slabs 59 and 60, is filled with a strip of concrete, ordinarily referred to as a knit strip. The structure shown in FIG. 18 is for the purpose of connecting the tension members 29 in the slabs 59 and 60 so as to make the prestressing continuous across the knit strip. In order to accomplish this, the dead end anchor members 53, previously described, are utilized in conjunction with tension members 61, that have heads 62 that are of a similar character to the heads 28, said tension members 61 being made of high tensile strength steel just as are the tension members 29. In order to provide the connection shown in FIG. 18 between the two anchor members 152 and 252 associated with the slabs 59 and 60, the dead end anchor bar 53 is slid into position in the anchor member 152 in the same manner as previously described in connection with the anchor member 52 shown in FIG. 14 and the anchor member 252 is moved away from the bearing plate 30 in the slab 60 by a suitable stressing means, a fragmentary portion of which is shown in FIGS. 18 and 19, which has fingers 63 that extend between a pair of the tension members 29 and on the outer sides of the other tension members 29 of the group shown in FIG. 19, and avoiding the shims 48, as will be obvious from FIG. 19. Said fingers 63 are provided on a downwardly extending arm 64 provided on said stressing means, any suitable means, such as hydraulic fluid, being utilized for moving pistons 65 in the cylinders 66 so as to move the piston rods 67 attached to the member 64 in a direction to move the fingers 63 away from the bearing plate 30. Suitable guiding means 68 is provided for the member 64, extending through openings 69 in frame members 70 that are mounted on the slab 60, and which have forwardly and downwardly extending arms 71 that terminate in plates 72 that engage the face 73 of the slab 60 so as to prevent bodily movement of the stressing means away from the anchor member 252.

It will be noted that as the stressing means is actuated to move the arm 64 away from the slab 60 the anchor member 252 will be moved to the position shown in FIG. 18. The tension members 61 and the two dead end anchors 53 having been previously assembled with the heads 62 in position against the flat faces 55 thereof, the anchor member 53 can then be slid into position in the anchor member 252 shown in FIG. 18, whereupon the shims 48, which have been released and would tend to drop out of position, can be recovered on the side of the structure having the anchor member 252 provided therein, and upon removal of the stressing means having the fingers 63 from engagement with the anchor member 252 the pull of the tension members 29 in the slab 60 exerted on the anchor member 252 will put the tension members 61 under tension and this will also release the shims 48, which can then also be recovered, the anchor members 152 and 252 being then held in position to prestress the slabs 59 and 60 by means of the connection provided by the tension members 61 and the anchor bars 53.

While a single anchor member is shown in FIGS. 10 to 13 inclusive, associated with the tension members, it is often the case that a large group of tension members 29 are provided in a heavily prestressed concrete structure as shown in FIG. 20. A single anchor plate 30" is shown associated with a plurality of anchor members 52, which are arranged in side by side relation with the outer faces of the leg portions 24 thereof in face to face engagement. Such a group of anchor members is shown as being tack welded at 34 to the anchor plate 30", FIG. 20 showing the unit after assembly and corresponding to the position of the parts shown in FIG. 4, except that the clips for holding the heads of the tension members 29 against the curved walls 27 of the anchor members have already been removed and the unit is ready for receiving the pulling member. While each of the members 52 is a separate unit as shown in FIG. 20, the same anchorage can be provided by means of a single unit 52" shown in FIG. 21, which is provided with the legs 24 and 24', that have the inwardly directed flanges 25, such as previously described, and which have the entrance slots 36 between the same, and which have the inclined wall portions 26 on the flanges 25 and the curved wall portions 27, thus cooperating with the heads of the tension members 29 and with the pulling member having the head portion 43 and the dead end anchor bar 53 in the same manner as the previously described anchor members, the anchor member 52" being tack welded to the anchor plate 30" by tack welds 34 at opposite ends thereof.

In the form shown in FIG. 20, said tension members 29 associated with the members 52, can be stressed by suitable stressing means so that all of the anchor members 52 are moved to their final position for placing the members 29 under the desired tension either simultaneously by suitable multiple pulling members, or each anchor member can be moved separately to stress the tension members associated therewith to meet desired loading conditions, while the anchor member 52" shown in FIG. 21 would be pulled away from the bearing plate 30" by a single pulling member so as to put all of the tension members 29 under tension simultaneously. Obviously the shims used in such a structure as shown in FIG. 20 could be individual for each anchor member or of a length equal to the height of the combined group of anchor members 52 and in FIG. 21 of a length equal to the height of the member 52" to hold all of the tension members 29 in their stressed condition. While three channels are shown in FIGS. 20 and 21, the number is merely illustrative, and can be increased or decreased from what is shown.

An adhesion preventing coating, such as commonly used on parts embedded in concrete that have to move relative to concrete in prestressing the concrete by a post-tensioning method, is applied to all such parts before pouring the concrete, in all forms of my invention.

What I claim is:

1. An anchor member for tension members for prestressing concrete having an elongated rigid body portion channel shaped in cross section to provide a pair of parallel legs thereon connected by a transverse portion having a longitudinally extending row of openings therethrough, said legs having inwardly directed undercut flanges at their extremities extending longitudinally of said body portion, said flanges having inner faces inclined transversely of said flanges.

2. An anchor member for tension members for prestressing concrete having an elongated rigid body portion channel shaped in cross section to provide a pair of parallel legs thereon connected by a transverse portion having a row of openings therethrough spaced longitudinally of said transverse portion, said legs having inwardly directed undercut flanges at their extremities extending longitudinally of said body portion, said flanges having inner faces inclined transversely of said flanges and said transverse portion having a flat outer face.

3. A tendon for prestressing concrete structures packaged for shipment comprising tension members, a bearing member having a flat face, an anchor member channel shaped in cross section having a transverse portion having a flat outer face tack welded to said bearing member with the outer face of said transverse portion thereof in face to face engagement with said flat face of said anchor member, said members having aligned openings therein through which said tension members extend and enlargements on said tension members engaging the inner side of the said transverse portion of said anchor member.

4. A tendon for prestressing concrete structures packaged for shipment comprising tension members, a bearing member having a flat face, an anchor member having a body portion channel shaped in cross section to provide a pair of parallel legs thereon connected by a transverse portion, said transverse portion having a flat outer face, said legs having inwardly directed undercut flanges at their extremities, said flanges having inner faces inclined transversely of said flanges, said anchor member being tack welded to said bearing member with the outer face of said transverse portion thereof in face to face engagement with said flat face of said bearing member, said members having aligned openings therein through which said tension members extend and enlargements on said tension members engaging the inner side of the said transverse portion of said anchor member.

5. A tendon for prestressing concrete structures packaged for shipment comprising tension members, a bearing member having a flat face, an anchor member having a body portion channel shaped in cross section to provide a pair of parallel legs thereon connected by a transverse portion said transverse portion having a flat outer face, said legs having inwardly directed undercut flanges at their extremities extending longitudinally of said body portion, said anchor member being tack welded to said bearing member with the outer face of said transverse portion thereof in face to face engagement with said flat face of said bearing member, said members having aligned openings therein through which said tension members extend, enlargements on said tension members engaging the inner side of the said transverse portion of said anchor member and a retainer member mounted in said channel member, said retainer member having a transverse portion engaging said heads and diverging legs having their ends seated in said undercut flanges.

6. The combination with an anchor member for tension members for prestressing concrete having a rigid elongated body portion channel shaped in cross section to provide a pair of rigid parallel legs thereon connected by a transverse portion having a longitudinally extending row of openings therethrough, said legs having inwardly directed undercut flanges at their extremities extending longitudinally of said body portion having inner faces inclined transversely of said flanges, of a pulling member having an elongated bar-like head portion thereon longitudinally slidably connected with said anchor member and having undercut shoulders thereon having inclined faces engaging the inner faces of said undercut flanges, said head portion having side faces engaging the inner sides of said legs.

7. The combination with an anchor member for tension members for prestressing concrete having a rigid elongated body portion channel shaped in cross section to provide a pair of rigid parallel legs thereon connected by a transverse portion having a longitudinally extending row of openings therethrough, said legs having inwardly directed undercut flanges at their extremities extending longitudinally of said body portion having inner faces inclined transversely of said flanges, of a pulling member having an elongated bar-like head portion thereon longitudinally slidably connected with said anchor member and having undercut longitudinally extending shoulders thereon having inclined faces engaging the inner faces of said undercut flanges, said head portion having side faces engaging the inner sides of said legs, tension members extending through said openings and enlargements on said tension members engaging the inner side of said transverse portion of said anchor member.

8. In concrete construction a concrete structure having a bearing member anchored in a marginal portion thereof, an elongated anchor member mounted in spaced relation to said bearing member, said anchor member having a body portion channel shaped in cross section to provide a pair of legs thereon connected by a transverse portion, said legs having inwardly directed undercut longitudinally extending flanges at their extremities, said flanges having inner faces inclined transversely of said flanges, said members having openings therein, tension members extending through said openings transversely to the length of said anchor member and having heads engaging the inner face of said transverse portion, shims mounted between said bearing member and said transverse portion, a second concrete structure adjacent said first mentioned structure, an elongated anchor bar longitudinally slidably engaged with said anchor member having undercut longitudinally extending shoulders having inclined faces engaging the inner faces of said undercut flanges and having a central longitudinal projection engaging between said flanges, said bar having a longitudinal row of openings therein, tension members extending through said openings and having heads thereon engaging the side of said bar opposite said undercut shouldered side and means at the marginal portion of said second structure remote from said first structure for tensioning said last mentioned tension members.

9. In concrete construction a pair of spaced concrete structures each structure having a bearing member anchored in a marginal portion thereof, an elongated anchor member mounted in spaced relation to said bearing member, said anchor member having a body portion channel shaped in cross section to provide a pair of legs thereon connected by a transverse portion, said legs having inwardly directed undercut longitudinally extending flanges at their extremities, said flanges having inner faces inclined transversely of said flanges, an elongated anchor bar mounted in each of said anchor members having undercut longitudinally extending shoulders on one side thereof having inclined faces engaging the inner faces of said undercut flanges, said anchor bars having openings therethrough, tension members connecting said bars extending through said openings and heads on said tension members engaging the sides of said bars opposite the sides having said undercut shoulders.

10. The combination with a rigid elongated anchor member for tension members for prestressing concrete of a rigid elongated pulling member longitudinally slidably connected therewith, one of said members having a body portion channel shaped in cross section to provide a pair of rigid parallel legs thereon connected by a transverse portion, said transverse portion having a longitudinally extending row of openings therethrough, said legs having inwardly directed undercut flanges thereon at their extremities, said flanges having inner faces inclined transversely of said flanges, the other of said members having a rigid bar-like head portion thereon having undercut shoulders thereon having inclined faces engaging the inner faces of said undercut flanges, said bar portion having side faces slidably engaging the inner side faces of said legs.

11. In means for prestressing a concrete structure by a post-tensioning method, an elongated anchor bar having a flat face on one side thereof, a central longitudinally extending rib on the side thereof opposite that having said flat face, said rib having parallel flat side walls and longitudinally extending inclined shoulders on said last mentioned side of said bar at each side of said rib extending at an acute angle to said rib side walls, said bar having a longitudinally extending row of openings therein extending transversely through said bar between said flat face and rib, tension members extending through said openings and heads on said tension members larger than said openings engaging the flat face of said bar.

12. The combination with a plurality of tension members for prestressing concrete of a rigid elongated anchor member for said tension members having a longitudinally extending row of transversely extending openings therethrough and a rigid elongated pulling member longitudinally slidably connected therewith, one of said members having an elongated body portion channel shaped in cross section to provide a pair of rigid parallel legs thereon connected by a transverse portion, said legs having inwardly directed undercut flanges thereon at their extremities extending longitudinally of said body portion having inner faces inclined transversely of said flanges, the other of said members having a rigid bar-like body portion having undercut longitudinally extending shoulders thereon having inclined faces engaging the inner faces of said undercut flanges, said bar-like portion having longitudinally extending side faces slidably engaging the inner sides of said legs, said tension members extending through said openings, and heads on said tension member larger than said openings.

References Cited by the Examiner

UNITED STATES PATENTS

| 1,233,933 | 7/1917 | Swartsfager | 287—103 |
| 2,494,526 | 1/1950 | Tungett et al. | 24—123.1 X |
| 2,637,895 | 5/1953 | Blaton | 52—228 X |
| 2,755,657 | 7/1956 | Finsterwalder | 52—223 |
| 2,867,884 | 1/1959 | Brandt | 25—118 X |
| 2,963,764 | 12/1960 | Finsterwalder | 52—223 X |
| 3,022,713 | 2/1962 | Friberg | 52—230 X |
| 3,060,639 | 10/1962 | Fields et al. | 52—173 |
| 3,099,109 | 7/1963 | Hahn | 52—223 |

FOREIGN PATENTS

| 155,756 | 3/1954 | Australia. |
| 489,515 | 1/1953 | Canada. |
| 694,596 | 7/1953 | Great Britain. |
| 1,032,214 | 3/1953 | France. |
| 145,214 | 3/1954 | Sweden. |

FRANK L. ABBOTT, *Primary Examiner.*

JACOB L. NACKENOFF, RICHARD W. COOKE, JR.,
*Examiners.*

A. C. PERHAM, *Assistant Examiner.*